Patented Nov. 17, 1931

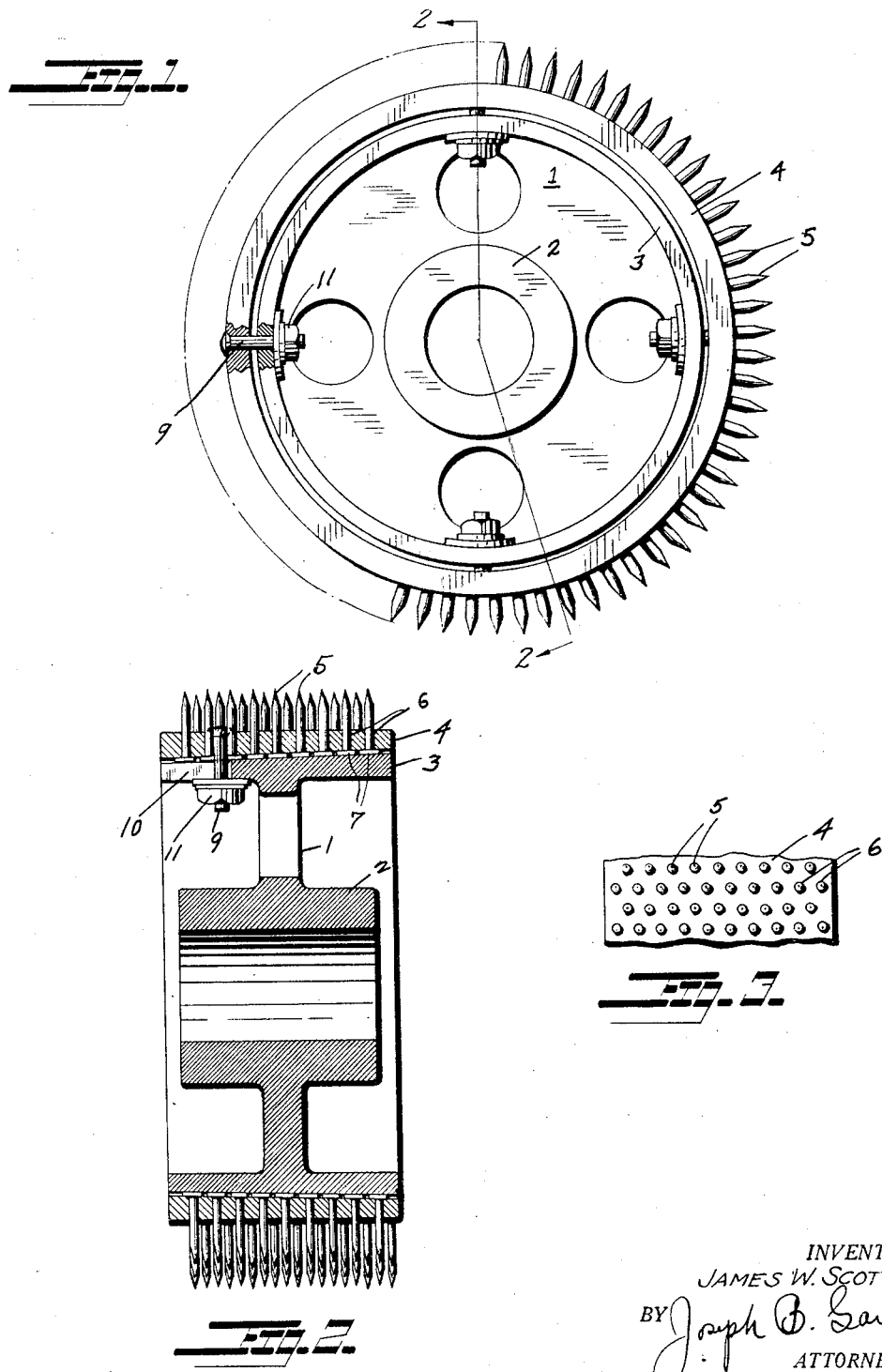

1,832,509

UNITED STATES PATENT OFFICE

JAMES W. SCOTT, OF LOS ANGELES, CALIFORNIA

TIRE RASP

Application filed October 28, 1929. Serial No. 403,109.

The invention relates to a rasp for removing and roughing the worn rubber tread portion of a tire casing preparatory to retreading the tire.

An object of the invention is to provide a novel tire rasp of the character described which is made up in wheel form and adapted to be power driven whereby, owing to the construction and arrangement thereof, the tread surfaces of worn tire casings may be quickly and easily prepared for retreading in a particularly efficient manner.

Another object of the invention is to provide a rasp of the character described in which there are provided a plurality of novelly arranged rasping teeth of sharp pointed formation and subject to ready and easy removal and replacement with a minimum of labor and time.

A further object is to provide a tire rasp of the character described in which the teeth are carried by a removable rim arranged whereby the teeth are securely held in place when the rim is positioned on the wheel and special or extraneous fastening elements for said teeth are therefore unnecessary.

Still another object is to provide in a rasp of the character described a novel means of simple and readily operable form for detachably but firmly securing the rim and teeth on the wheel.

Further, one of the objects of the invention is to provide a rasp of the character described in which the ordinary tack or similar headed pointed fastening may be used to provide the rasp teeth.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings,

Figure 1 is a side elevation of the tire rasp of this invention.

Figure 2 is a vertical sectional view taken on the plane of line 2—2 of Figure 1.

Figure 3 is a fragmentary plan view showing the arrangement of the teeth.

The embodiment of my invention as shown in detail in the accompanying drawings comprises a circular wheel body 1 having a central hub bearing 2 permitting of the mounting of the wheel on a rotary shaft not shown. The wheel is provided with a felly portion 3 which is beveled or tapered on its outer surface to provide a wedging interfit with a removable rim 4 similarly tapered on its inner surface. On the rim 4 are the rasp elements, or teeth 5, here shown in the form of small nails or tacks removably supported by the rim and held in place by engagement with the felly portion 3. Preferably the rim is provided with a series of straight transverse rows of openings 6 through which the teeth 5 are inserted in such manner that the heads 7 will be clamped between the opposed faces of the rim and felly 3.

It will be noted that the pointed ends of the teeth are disposed in rows which are straight in transverse planes across the periphery of the wheel and therefore these points may be readily and easily reached with a file in order to sharpen them. However, the teeth are in effect self-sharpening due to the fact that the points are relatively long and to the abrasive action of the tires treated with the wheel. Preferably the rim 4 is of sufficient width to provide sockets equal to approximately half the length of the teeth, whereby a secure anchorage of the teeth is provided and the bending tendency is minimized. Furthermore, the teeth are of such diameter as to frictionally remain in place when the rim is removed whereby dropping of the teeth out of place is prevented. However, the teeth may be readily displaced and removed when desired to insert new teeth.

Means is provided for securely and detachably fastening the rim in place and, as here shown, comprises lugs 9 carried by and projecting inwardly and radially from the rim 4. These lugs are adapted to engage in transverse slots 10 formed in the felly 3 of the wheel, the slots opening on the smaller side of the wheel. Nuts 11 are turned on the inner threaded ends of the lugs 9 and thereby provide for detachably securing the rim on the wheel. Although this fastening means as been found satisfactory, I may use any other suitable means for detachably securing the rim on the wheel.

It will be noted that owing to the detachable rim and the removable teeth, the worn or broken teeth may be easily and quickly replaced without removing the wheel from its mounting. On a stub shaft installation, the rim may be removed and a new rim with teeth assembled may be quickly substituted without removing the wheel proper.

While the teeth are parallel in straight rows transversely of the wheel, they are in staggered relation circumferentially whereby, when rotated, a particularly effective rasping action is provided.

It will now be clear that with the rasp of this invention set up for hand or power rotation, a tire casing may be prepared for retreading in a particularly fast and efficient manner. The teeth not only remove the worn portions of the tread as desired, in an efficient manner, but leave a roughened surface which better prepares the tire for the retreading operation.

I claim:

1. In a tire rasp, a wheel having a transversely tapered circumference, a removable rim having a similarly tapered inner periphery, and provided with a plurality of openings extending radially therethrough, a plurality of long pointed teeth inserted through said openings and extended outward from the rim, heads on said teeth clamped between the rim and wheel, lugs on said rim having threaded inner ends, said wheel having transversely extending slots in the periphery thereof opening on the smaller side of the wheel and adapted to receive said lugs, and nuts turned on the threaded ends of said lugs and removably holding the rim in place.

2. In a tire rasp assembly, a wheel and rim designed for assembly in nested relationship, the wheel having a tapered periphery and the rim having a tapered inner wall adapted to cooperate with the tapered periphery of the wheel, a plurality of headed rasping elements extending through openings in the rim, the rasping portions of said elements extending beyond the periphery of the rim, the tapered portions of the wheel and rim wedgingly clamping the opposite sides of the heads of the rasping elements, whereby the said elements are securely held in position.

In testimony whereof, I have hereunto set my hand at Los Angeles, California, this 14th day of October, 1929.

JAMES W. SCOTT.